US005912630A

United States Patent [19]

McCullough et al.

[11] Patent Number: 5,912,630

[45] Date of Patent: Jun. 15, 1999

[54] SKIPPED NUMBER DISPLAY FOR CUSTOMER SERVICE CONTROL SYSTEM

[76] Inventors: Robert K. McCullough; Daniel R. McCullough, both of P.O. Box 1700, Broken Arrow, Okla. 74013

[21] Appl. No.: 08/785,340

[22] Filed: Jan. 17, 1997

[51] Int. Cl.[6] .......... H04Q 1/00

[52] U.S. Cl. .......... 340/825.17; 340/825.35

[58] Field of Search .......... 340/825.17, 825.35, 340/825.44, 311.1, 286.01, 286.06, 286.09, 309.4, 309.15; 705/15

[56] References Cited

U.S. PATENT DOCUMENTS

| | | | |
|---|---|---|---|
| 4,388,689 | 6/1983 | Hayman et al. | 705/15 |
| 4,530,067 | 7/1985 | Dorr | 705/15 |
| 4,935,720 | 6/1990 | Kalfoun | 340/286.09 |
| 4,992,774 | 2/1991 | McCullough | 340/310 |
| 5,003,472 | 3/1991 | Perrill et al. | 705/15 |
| 5,245,163 | 9/1993 | Yehuda | 235/377 |
| 5,377,097 | 12/1994 | Fuyama et al. | 364/401 |
| 5,390,107 | 2/1995 | Nelson et al. | 364/401 |
| 5,541,835 | 7/1996 | Dextraze et al. | 364/401 |
| 5,602,730 | 2/1997 | Coleman et al. | 705/15 |

FOREIGN PATENT DOCUMENTS

| | | | |
|---|---|---|---|
| 59-142669 | 8/1984 | Japan | 705/15 |

OTHER PUBLICATIONS

Visual–Page Systems Series 3600 Pharmacy Customer Call Sales Brochure dated Jun. 1993.

*Primary Examiner*—Edwin C. Holloway, III

*Attorney, Agent, or Firm*—Robert R. Keegan; Head, Johnson & Kachigian

[57] ABSTRACT

There is disclosed a system and method to call sequentially serviced customers from a large area, such as a retail store, back to a pick-up counter, keeping track of any customer's jobs that have been skipped and not paged after a predetermined time. For example, in a pharmacy a customer is given a number when presenting a prescription to be filled. When the prescription is ready the customer's number is entered and shown on a large display in the center of the store to page the customer. If a number is skipped then this system solves the problem by showing the pharmacist skipped numbers on a screen of a keypad after a preset wait period and advises the pharmacist to determine why the customer was skipped. The system has an algorithm for detecting erroneous entries and recovery if a wrong number is accidentally entered.

16 Claims, 6 Drawing Sheets

SKIPPED NUMBER DISPLAY FOR CUSTOMER SERVICE CONTROL SYSTEM

BACKGROUND OF THE INVENTION

The present invention relates to situations in which services are provided, usually by multiple servers, to numerous persons being served in which the tasks are sequentially identified by a number or otherwise and completion of service is communicated to a person being served, usually a customer, by the task identification. In such systems, it is desirable to have a method of recognizing mishaps or failures that result in unreasonable delay in completion of service for a particular task. Systems are known in which each accepted task is logged in with a time of acceptance so that an arbitrary limit can be set for the time required for completion of the task before it is called to the attention of supervisory personnel.

The method and apparatus of the present invention departs from such known procedure and provides a shorter procedure which, at the same time, tends to adapt to circumstances and avoid excessive indications of problems or mishaps while reliably and promptly catching any oversight or mishap that could cause unreasonable delay in completing service. The method and apparatus according to the invention is particularly adapted to use in high volume pharmacies and that use will be explained for the purpose of illustration. Clearly the system will have many other uses as in fast food establishments and other “while you wait” or fast service environments.

The system according to the invention is particularly useful in large retail stores where there is a pharmacy or other fast service department. In the absence of such a system, customers would take their prescriptions to the pharmacy to be filled and would often wait near the counter until the task of filling the prescription was completed and the customer's name was called.

If the prescription is identified by a number (normally issued in increasing order) it is then possible to provide a display visible from all parts of the retail store, by means of which the customer can be advised of the completion of the task of filling his prescription by display of the assigned number. Such a system has several advantages, not the least of which if that pharmacy customers circulating in the store may find other items to purchase. A potential problem exists in that where several pharmacists are filling prescriptions in a high volume pharmacy, the order in which the prescriptions are ready will not necessarily be sequential. It is possible that a prescription will be mislaid or misdirected or otherwise left unattended to. This would leave one of the customers waiting for an unacceptable amount of time causing an embarrassing situation or a more serious customer relation problem.

The improvement represented by the present method and apparatus is particularly directed to avoiding the situation where a prescription or other task is skipped over, with delay and inconvenience to a customer. The system of the invention recognizes that as long as the prescriptions are filled or the tasks are completed in the same order that they were accepted, one can be assured that only normal and average delays are being encountered. Therefore, close attention need be given only to those tasks where are “skipped”, that is to say not completed in the same order in which they were accepted. Furthermore, by monitoring the time from which the task in question was skipped rather than the full time from which it was accepted, allowance is automatically made for the current normal speed of task completion. Therefore, only a short time after being skipped is a significant indication of a problem so that a four or five minute threshold will promptly catch mishaps without causing numerous false indications.

Computerized control apparatus, as well as the method, is disclosed for implementing the system and will be described in detail hereinafter. Clearly the practical way to implement the system is by microcomputer software controlled apparatus although it should be theoretically possible to implement the method using handwritten notes and tally sheets.

Numerous forms of queue monitoring or control systems, customer order processing systems, and the like have been proposed having generally similar objectives, but they do not suggest or disclose the apparatus and method of the present invention.

U.S. Pat. No. 5,245,163 to Yehuda shows a system for monitoring the combined waiting and service time for customers in a single queue with multiple service clerks scenario. The system monitors every customer transaction to establish the total time it takes for the customer to get to a service representative through the use of a card dispenser at the end of the queue and a card reader at each service station. This system differs from the McCullough invention in that it does not monitor the service sequence to determine when a customer has been skipped; does not notify an operator when a skipped customer occurs; and the Yehuda invention times the customer waiting period before actually being serviced while the McCullough invention only times the service delay after a customer order is processed out of sequence.

U.S. Pat. No. 5,541,835 to Dextraze et al. discloses a system for monitoring the combined waiting time for customers in a single queue with multiple service clerks scenario. The system monitors every customer transaction to establish the total time it takes for the customer to get through the queue and be fully serviced. It does this through a sensor at the end of the queue and sensors located at each service station. The main advantage over the Yehuda invention is that this invention also times the service time at each teller. This system differs from the McCullough invention in that it does not monitor the service sequence to determine when a customer has been skipped; does not notify an operator when a skipped customer occurs; and the McCullough invention specifically times those customers that have been skipped, while the Dextraze invention times all customers within the queue; and the McCullough invention specifically times the extended service time for a customer after being skipped, whereas the Dextraze invention times the total service time for a customer.

U.S. Pat. No. 5,390,107 to Nelson et al. shows a system designed to monitor the entry and exit of customers to determine the number of customers within a store. It then uses this information to predict the appropriate number of service personnel at a future time. This allows the store to establish an appropriate balance between clerk efficiency and customer service. This system differs from McCullough in that Nelson monitors the customer entry and exit rates for the store, measuring shopping time, line-waiting time, and service time; McCullough specifically monitors excess service time for skipped customers; Nelson uses pre-established customer and service characteristics to predict future events, while McCullough directly monitors the extended service times; Nelson monitors customer time within the store while McCullough specifically monitors excess service time and Nelson does not monitor the customer service sequence for skipped customers.

U.S. Pat. No. 5,377,097 to Fuyama et al. discloses a system for servicing of customers in a fast-food type restaurant environment. The system sequentially controls the processing of customers through the system and gives an efficient method for the processing of food orders. While this system monitors the customer total service time and alerts by a blinking light when the service time exceeds a preset limit, it differs from McCullough in that Fuyama monitors the entire customer service time while McCullough specifically monitors service time after a customer has been skipped.

Fuyama allows for the recall of mistakenly deleted orders and the correction of order item entries while McCullough allows for the deletion of an incorrect entry and correction of the number sequence; Fuyama displays the total customer service time to the operators on every order and can blink the service time when an excessive amount of time has lapsed while McCullough only displays the customer number after the skipped service time has surpassed a preset maximum allowable waiting period.

To summarize the above comments none of these prior systems monitor the system to determine skipped customers; have a method for displaying completed orders ready for pickup; use a method for only monitoring those customer situations which are outside of the "norm." All of these systems monitor every customer's time period.

A prior McCullough U.S. Pat. No. 4,992,774 is the basis for a commercial pharmacy customer call system in use since 1993 which provides discreet paging by numerical display, but has no customer service monitoring features.

SUMMARY OF THE INVENTION

In addition to providing the features and advantages described above, it is an object of the present invention to provide a paging system for customers in a fast service facility or fast service department which combines the feature of notifying customers by means of a visual display that their order for service is ready to be delivered to them and that they should return to the customer counter or the delivery location; it includes features for monitoring and controlling the performance of service by multiple servers to avoid and/or correct mistakes and oversights that would cause delay and inconvenience to customers.

It is another object of the present invention to provide such a system with a reduction in necessary data processing by specifically monitoring those tasks which are not ready in normal sequence, i.e. skipped tasks, and measuring time from such task skipped event before an alert signal is communicated.

A further object of the present invention is to provide such a system which allows correction of keyboard errors and reduces the number of premature alert signals while maintaining the overall function of maintaining prompt and efficient customer service.

BRIEF DESCRIPTION OF THE DRAWINGS

Other objects and advantages of the present invention will be apparent from consideration of the drawing description in conjunction with the appended drawings, in which.

DETAILED DESCRIPTION OF THE PREFERRED EMBODIMENT

For clarity and simplicity, the present invention in this disclosure will be explained with reference to use of the invention in connection with a pharmacy located in a large retail store. An advantage of the system is that it is compatible with existing procedures in many large pharmacies of this type. Such figures and procedures frequently include giving the customer a ticket, coupon, or other paper on which there is a sequentially issued number, while this same number is applied to the customer prescription form from which the pharmacist will be working. Although this initial step of assigning matching identities to the customer paper slip and to the prescription form is the initial step of the method of the invention, it is not relevant what exact procedure or mechanism is involved. Commonly the numbers from 00–99 are used for the sequence and this can be implemented with sequentially numbered tickets, sequentially numbered coupons, a "Bates" number stamp which stamps sequential numbers, with "twin checks" in the form of sequentially numbered pairs of self-adhesive labels, or in the simplest case, a clerk may simply write a sequential number on a piece of paper or coupon and hand the paper to the customer while writing the same number on the prescription.

Figure 1:
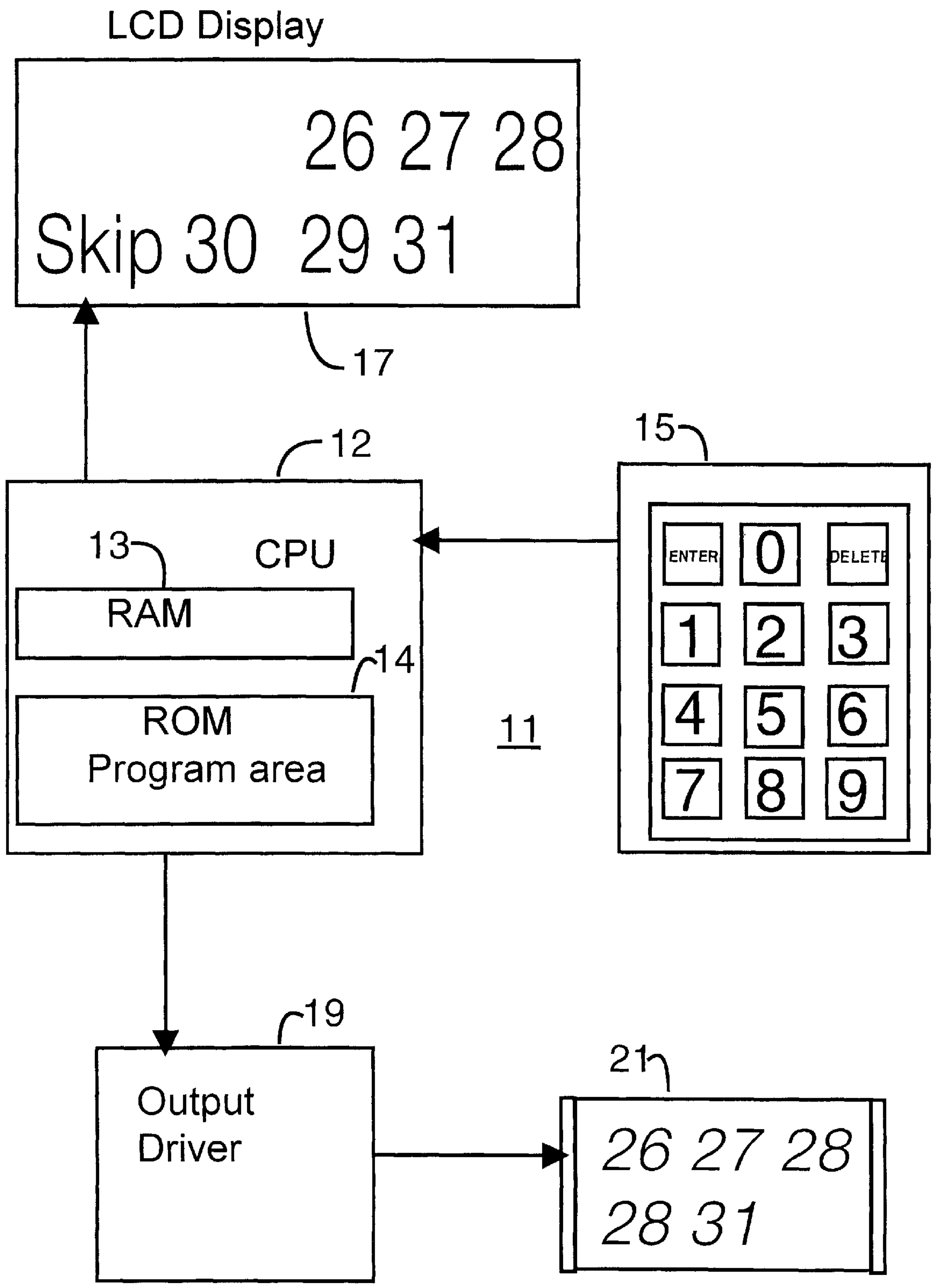
FIG. 1 is a schematic block diagram showing a customer service control system having a skipped number display according to the invention.

It being understood that Applicant's apparatus supplements one of the foregoing procedures, it will be seen that FIG. 1 shows a customer service control system 11 including a central processor unit which characteristically contains a random access memory (RAM) 13 and a read-only memory (ROM) a portion of which is utilized to store the software program for carrying out the method of the invention.

A keypad 15 is provided which may be of very simple form having only the decimal digits 0–9 and an enter and a delete button. It will be understood that a more complicated keypad could be employed, and, in fact, the function of the CPU 12 and the keypad 15 could be executed by a conventional, standard desktop or notebook computer programmed for the enablement of the method according to the invention.

A small alpha numeric display 17 is provided for local display of information to the pharmacist, and, as will later be described, the CPU 12, the display 17, and the keypad 15, may all be incorporated in a small palm size housing. The display 17 could be more or less elaborate and its function could also be implemented in a personal computer.

An output driver 19 is provided to transmit appropriate signals to a remotely located wide area display 21. The output driver 19 and the wide area display 21 are similar to units employed in a prior McCullough system without a customer service control feature.

Figure 2:
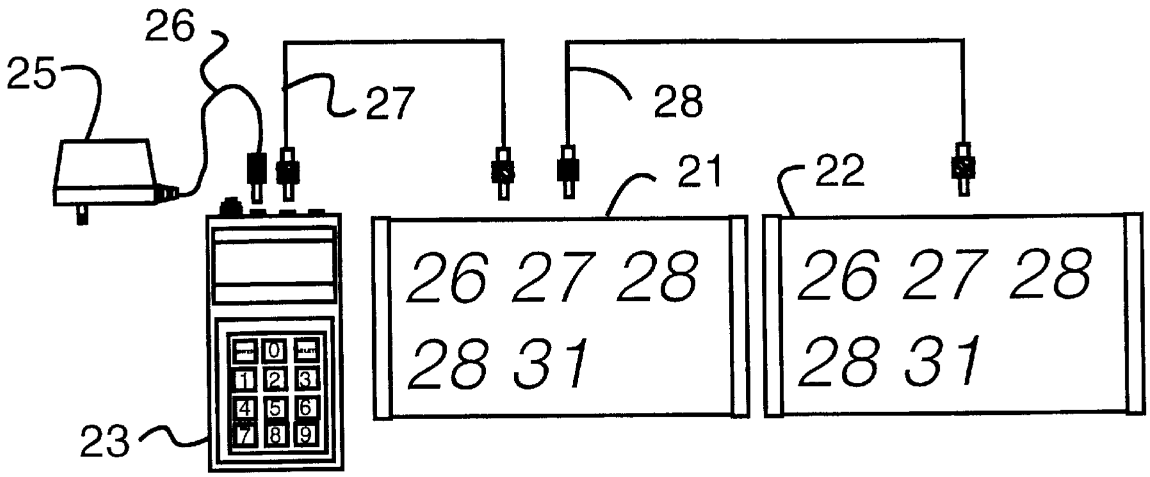
FIG. 2 is a partially schematic pictorial illustration on the apparatus of FIG. 1.
Figure 3:
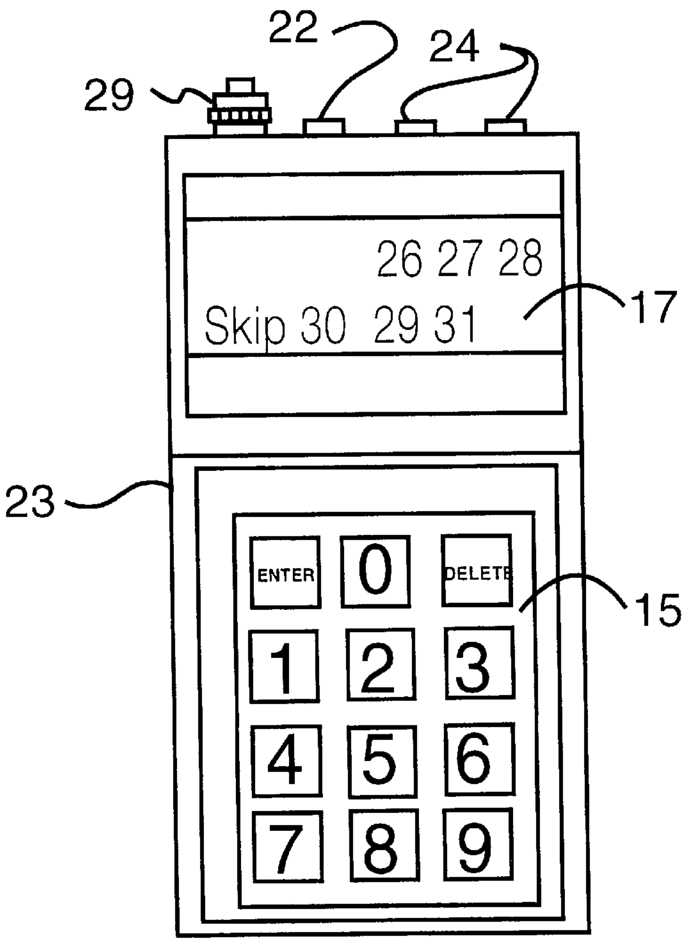
FIG. 3 is an enlarged plan view of the combined keypad local display unit shown in FIG. 2.

FIG. 2 shows an exemplary hardware implementation of the system shown schematically in FIG. 1 and FIG. 3 is an enlarged plan view of the entry and local display module which may incorporate the microprocessor and other components necessary for the central processing unit of the system. As shown in FIG. 2, entry and display module 23 is provided with a power supply 25 of conventional type which receives 150v AC power from a conventional electrical outlet and supplies low voltage power (usually DC) through a cord 26 to the entry and display module 23.

Wide area display 21 is connected by a cable 27 with appropriate connectors to entry and display module 23. Cable 27 is preferably a coaxial cable such as RG59/U but any of numerous available wired or wireless communication means may be employed to communicate data from the entry and display module and the CPU incorporated therein to wide area display 21. In many cases more than one wide area display will be desired and as shown in FIG. 2 an additional wide area display 20 may be provided and ganged together with wide area display 21 by a cable 28.

As seen in FIG. 3, entry and display module 23 is provided with a small local display 17 which may be a liquid crystal numerical display or any other suitable form of data display unit. As illustrated the local display 17 is capable of displaying six two-digit numbers indicating ready task identities together with a skipped number legend and one two-digit skipped number associated therewith. The capability, configuration, and size of the display 17 is a practical one but is arbitrary and subject to wide variation. The provision for ready task numbers could be enlarged or diminished and the skipped number portion of the display could be modified to show more than one skipped number if desired. Common features for displays such as flashing numbers, different colors, or the like could be incorporated if desired.

The entry and display module 23 is provided with a simple keypad 15 as previously discussed and also is provided with power jack 22 and data output jacks 24 for communicating data signals to wide area display 21 or other receiving devices.

Figure 4:
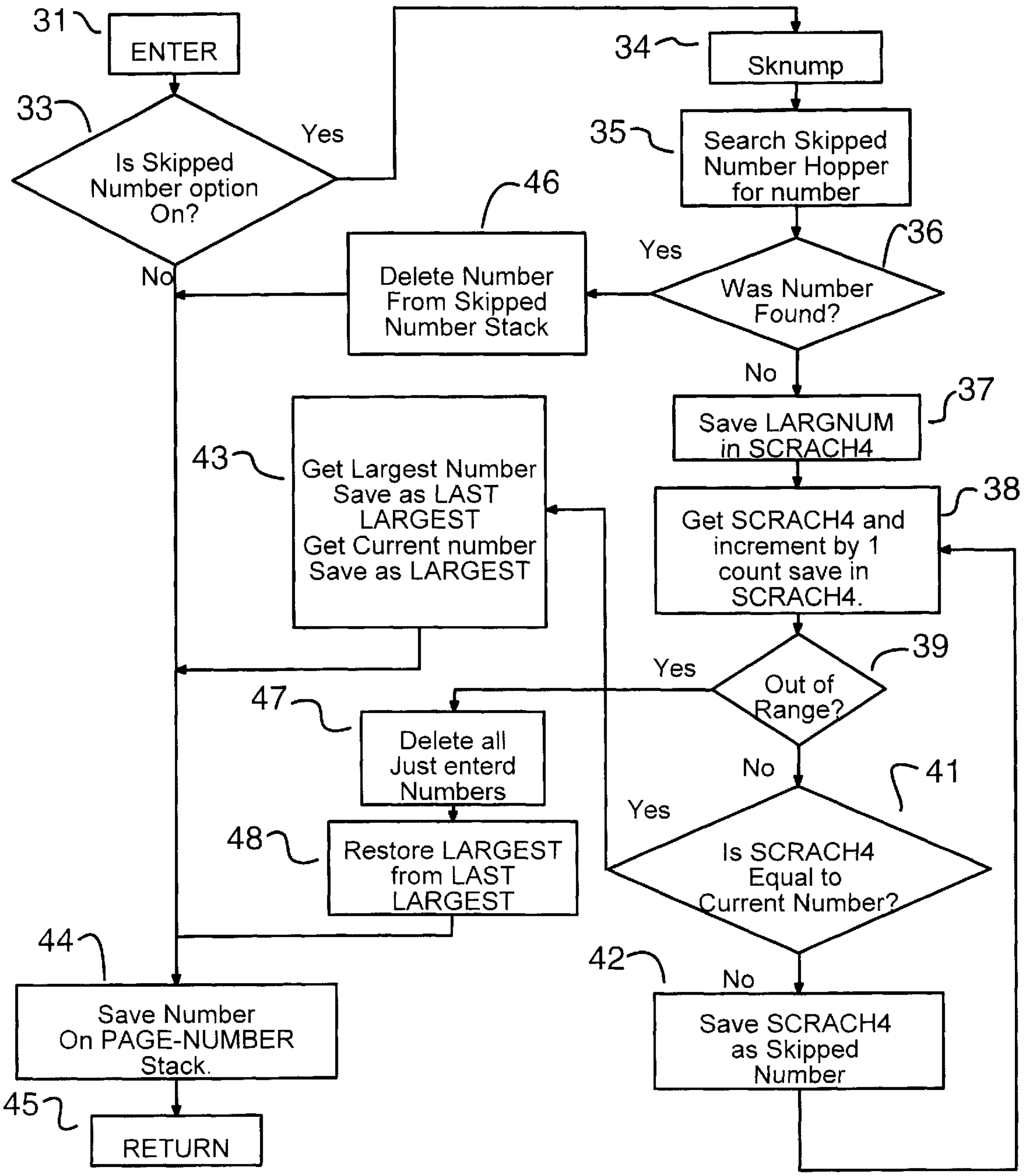
FIGS. 4–7 are flow charts useful in explaining the implementation of the method of the invention with computer software.

The method of operation of the system apparatus will be seen from FIGS. 4 through 7 and the following description. FIG. 4 shows the "entered and skipped number" routine which also sends ready task numbers to the wide area display.

Figure 5:
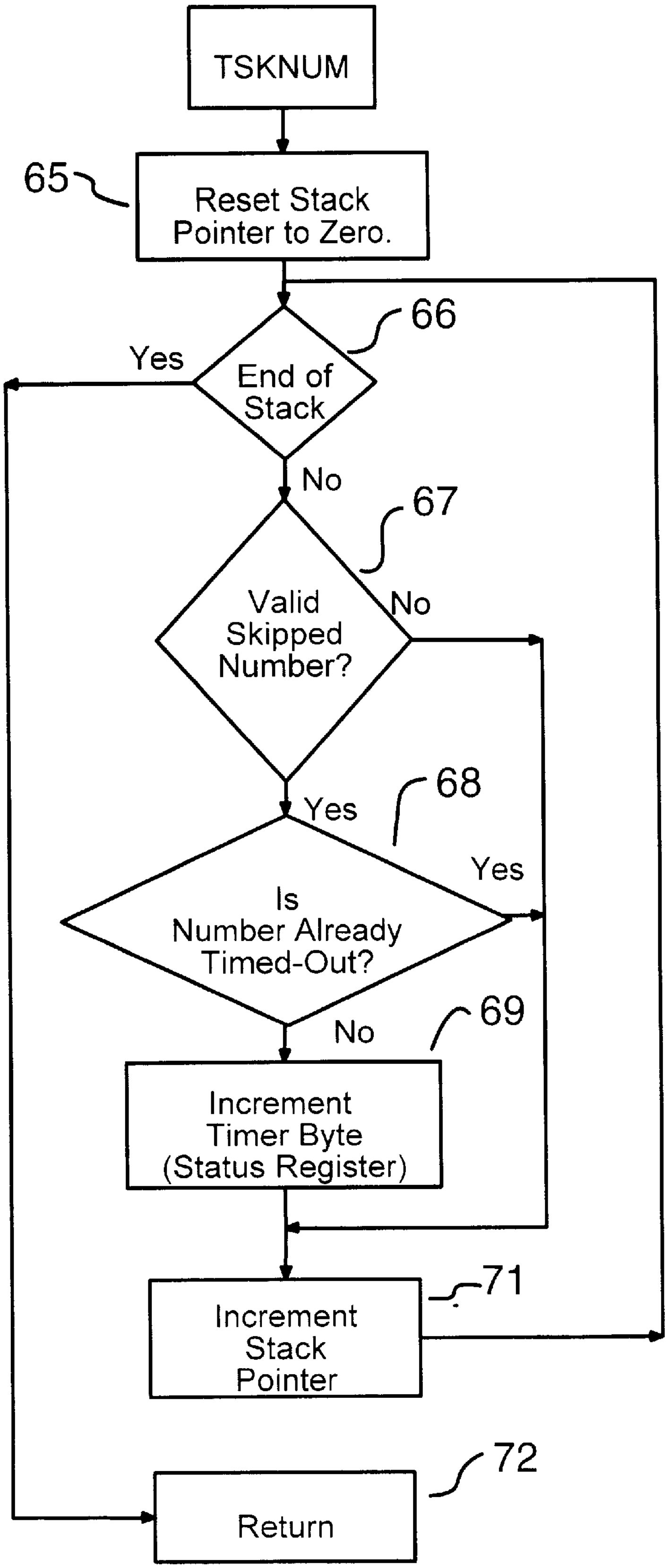
Figure 6:
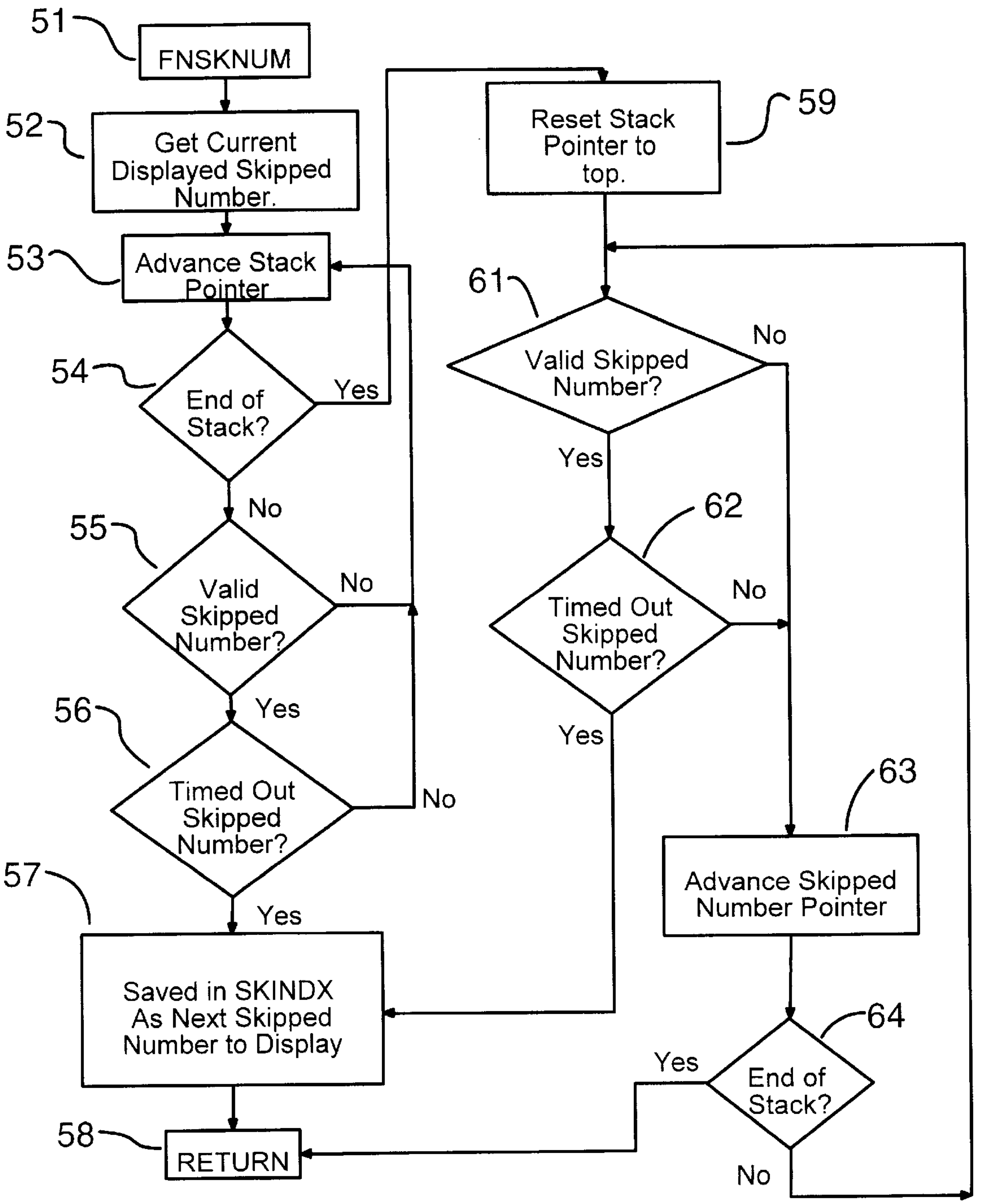
Figure 7:
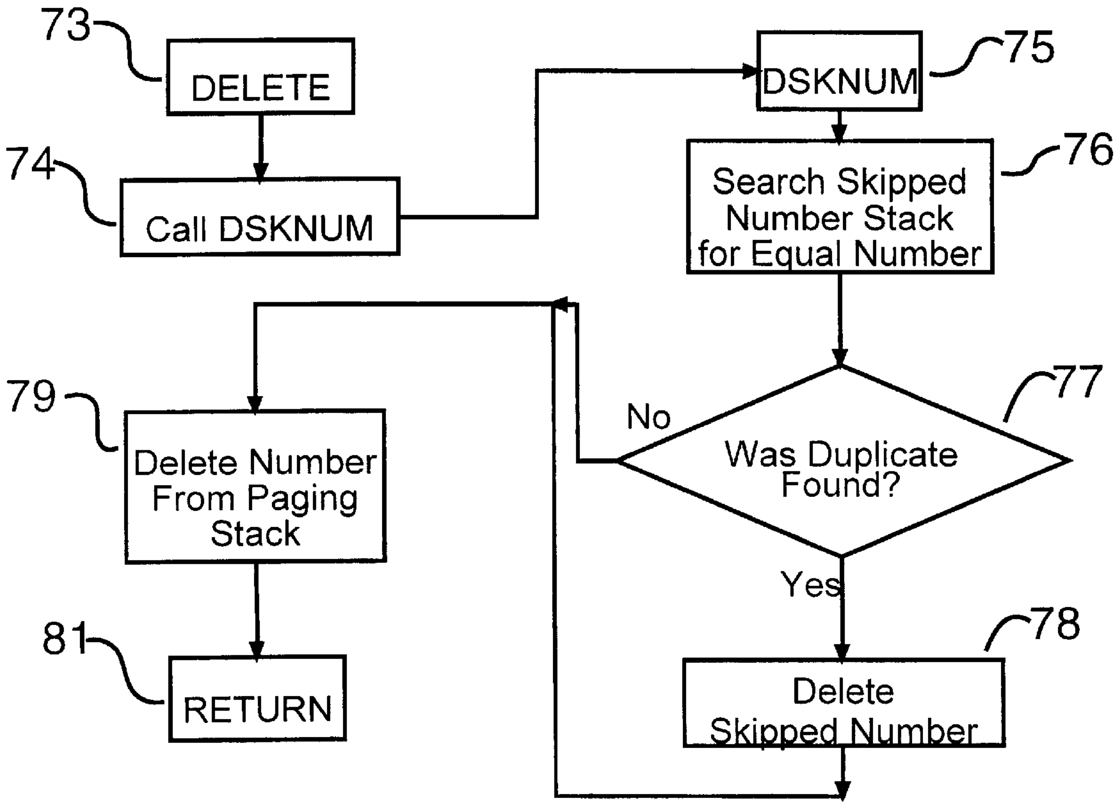

FIG. 5 shows the "skipped number timer" routine. FIG. 6 shows the "find and display timed out skipped number" routine. FIG. 7 shows "delete number and delete skipped number" routine.

Before describing the details of the method of the invention and the computer program which implements it, it is useful to describe an example of the way that the system operates in a particular environment, for example a pharmacy department in a large retail store.

An example would be as follows: Patient A comes into a pharmacy to fill his prescription. He proceeds to the pharmacy counter and presents his prescription to the clerk who hands Patient A ticket number "10" and instructs him to watch for his number on the RX READY sign in the center of the store. The prescription is then put in the "waiting" bin to be filled in its turn in accord with usual practice. Patient A proceeds about his shopping and occasionally glances at the RX READY sign to see if his number is being displayed. Patient B comes in with a prescription and likewise proceeds to the pharmacy counter and receives ticket number "11". Patient C does the same and receives ticket number "12". Finally Patient D does the same and receives ticket number "13".

A pharmacist by this time has filled Patient A's prescription and types "10", "ENTER" on the keypad. Patient A notices his number which is shown on the RX READY display and proceeds to the prescription pick-up counter to get his prescription.

A pharmacist working on Patient B's prescription notices that he needs more information from the doctor. The pharmacist places a call to the doctor who is busy but will return the call shortly. The efficient pharmacist does not wait for the return call and starts on Patient C's prescription, fills it and types "12", "ENTER" on the keypad. Patient C will see the resulting page and proceed to the prescription pick-up counter to get his prescription. At this point the service monitoring feature of the method and apparatus of the invention becomes effective by recognition of the out of sequence RX READY signal from the keypad. A pharmacist then starts on Patient D's prescription. When Patient D's prescription is ready and the pharmacist types in "13" to page Patient D, he will notice that the keypad shows "SKIP #11" if it has been longer than 5 minutes since Patient C's "12" was typed into the keypad. This serves to remind the pharmacist who forgot about the return phone call from Patient B's doctor. The pharmacist needs to act on the skipped patient whether it is to call the doctor back or advise Patient B that there is a problem with the prescription. Let's say the pharmacist calls the doctor back, clears any uncertainty and fills Patient B's prescription. When B's number "11" is entered into the keypad then the "SKIP #11" message disappears because that customer has now been serviced and his number deleted from the skipped number register.

The implementation of the method of the invention by the computer program will be understood by reference to the previous example and FIGS. 4 through 7 comprising block diagram flow charts of the computer program.

It should be noted that it is unnecessary to enter the number issued to the customer and to the customer's task (prescription) and no provision for doing so is included in the program. A computer routine for printing tickets and stickers with successive numbers could be employed with the program of the invention, but the program according to the invention operates on the assumption that accepted tasks are assigned successive (increasing) numbers and it does not need to have accepted task numbers entered until the task is ready for delivery.

As indicated at 31 in FIG. 4, the initial step in the method is entry of a prescription which has been filled and is "ready". As an optional feature, step 33 represents a switch by which the skipped number feature maybe turned off and rendered inoperative. Operation in accordance with the method of the invention obtains when the skipped number feature is "on". When the pharmacy starts the day's business the system is preferably initialized by entering and deleting the highest number of the previous day, i.e. the number just before the first number of this day.

When the skipped number option is "on" and a number pair is entered, the entry program first calls block SKNUMP at 34 and search routine 35 checks the skipped number hopper to see if that number has been previously skipped and is now entered for the first time. If found, block 36 routes the program to block 46 which deletes the just entered number from the skipped number stack and to the block 44 which saves the number on the page number stack, which is displayed on the wide area display and the local area display. If the number entered is found to have been skipped, this completes the operation and the program proceeds to return block 45 waiting for entry of another number pair.

If the number was not found in the "skipped number" hopper than the SKNUMP program determines if the number is next in sequence or if some number or numbers have been skipped. At this point, it should be noted that it has been determined that the number just entered is not a skipped number (i.e. lower than some previous number entered) and, hence, is the largest number entered.

The current number entered is saved in SCRACH4, block 37. SCRACH4 is then incremented, block 38, tested for out of range, block 39, and then compared to the current number, block 41. If these are equal on the first pass through then there is no skipped number and block 41 causes diversion to block 43 for housekeeping required for error correction purposes after which the current number proceeds to the page number stack 44 causing it to be displayed as a ready prescription and to block 45 returning the system to ready status. Block 39 which makes an out-of-range determination is part of an error-detecting optional procedure which will be explained hereinafter.

When block 41 determines that SCRACH4 is not equal to the current number, this indicates at least one skipped number and block 42 saves that skipped number from SCRACH4 in the skipped number hopper and returns control to block 38 to search for additional skipped numbers. This process continues until there are no more skipped numbers and the program control from block 41 is passed through blocks 43 and 44 to block 45.

An arbitrary number, in this example ten, is determined to be in excess of any actual skipped numbers that would be encountered and thus is presumably due to an input error such as entering "81" instead of "18". Block 39 acts to detect such an error and, if the current number is out-of-range (largest-number plus some number greater than 10), then all the numbers placed in the skipped number hopper are now deleted. This prevents loading of the skipped number hopper with trash if the operator makes a mistake. If the number is out-of-range as determined by block 39, the net result is "zero action". Routine SKNUMP is only called once each time a number pair is entered.

Once a skipped number is found it is saved on the skipped number hopper, block 42, along with a status byte. The skipped number hopper may be described as follows: the hopper has 10 slots for skipped numbers. Each slot holds two bytes of eight bits. The first byte is the status of that slot. The second byte is the two digit number being stored. Any skipped number and the status of that skipped number may be accessed by adding its index to the base address of "STATUS 1". This is a simple programming method for making a pointer that points to different numbers in an array. It is used in this program to point to the currently displayed skipped number (SKINDX). It should be noted that the system continues to operate in the same manner as the numbers progress from "98" and "99" through "00" and "01". This is due to a method of incrementing a 0–99 register to determine the next higher number. Thus "00" is the "next higher number" from "99", "01" is the next after that, etc.

| INDEX | STATUS | NUMBER |
|---|---|---|
| 0 | Status 1 | Skipped Number 1 |
| 2 | Status 2 | Skipped Number 2 |
| 4 | Status 3 | Skipped Number 3 |
| 6 | Status 4 | Skipped Number 4 |
| 8 | Status 5 | Skipped Number 5 |
| 10 | Status 6 | Skipped Number 6 |
| 12 | Status 7 | Skipped Number 7 |
| 14 | Status 8 | Skipped Number 8 |
| 16 | Status 9 | Skipped Number 9 |
| 18 | Status 10 | Skipped Number 10 |

The status byte contains the following data and is coded as follows:

| | Status Number Bit | 7 | 6 | 5 | 4 | 3 | 2 | 1 | 0 |
|---|---|---|---|---|---|---|---|---|---|
| | Status Bit Use | E | V | L | T | t | t | t | t |

| | | |
|---|---|---|
| t | Bit 0 | 0 = timer |
| t | Bit 1 | 0 = timer |
| t | Bit 2 | 0 = timer |
| t | Bit 3 | 0 = timer |
| T | Bit 4 | 1 = This number timed out else 0 = this number ok |
| L | BIt 5 | 1 = Last entered numbers |
| V | Bit 6 | 1 = This is a valid number else 0 = this is trash |
| E | Bit 7 | 1 = End of stack, first byte AFTER last register group |

The following registers are used and defined here:

SCRACH1 contains the number just entered.

SCRACH2 contains the index of the number just entered.

SCRACH3 contains the incremented version of LARGEST-ENTERED number (done to prevent corrupting LARGEST-ENTERED register.

SCRACH4 is the current incremented TO-BE-SAVED number.

LRGNUM contains the LARGEST INDEX so far today.

LASTLRG contains the LAST LARGEST INDEX so far today (in case it has to be restored because of operator error).

SKINDX contains the CURRENT-SKIPPED-NUMBER-INDEX being displayed on the LCD. This is updated by FIND-NEXT-SKIPPED-NUMBER PGM (FNSKNUM).

FIG. 5 shows a TIMED-SKIPPED-NUMBER program in the timer routine on the CPU. TSKNUM program of FIG. 5 is called periodically (every 18 seconds in this example) and it searches the entire skipped number hopper and increments the status bit of every valid skipped number. After a skipped number has been in the skipped number hopper for about five minutes, bit 4 is finally set as the status bit is incremented from 01×01111 to 01×10000. When bit 4 is set, the status register is no longer incremented. The binary incrementing would be as follows:

| | |
|---|---|
| Number first entered | 01x00000 |
| After 18 seconds | 01x00010 |
| After 36 seconds | 01x00011 |
| | 01x00100 |
| | 01x00101 |
| | 01x00110 |
| | 01x00111 |
| | 01x01000 |
| | 01x01001 |
| | 01x01010 |
| | 01x01011 |
| | 01x01100 |
| | 01x01101 |
| | 01x01110 |
| | 01x01111 |
| After five minutes | 01x10000 |

The process may be explained as follows. Block 65 resets the stack pointer after which block 6 tests for END-OF-THE-STACK, which, if found, causes a return by block 72 to the main program.

Block 67 detects invalid skipped numbers and increments the stack pointer at block 71 without further action. In similar fashion, block 68 detects numbers already timed-out and proceeds to block 71 which increments the stack pointer without further action. Block 69 operates only on valid skipped numbers which are not already timed-out and increments the timer byte in the status register location for that number.

The flow chart of FIG. 6 illustrates a routine (FNSKNUM) for finding a skipped number to be displayed to a pharmacist or other system operator as a notice to take corrective action. The FNSKNUM routine is called by block 51 every predetermined time cycle which, in this example, is one second.

The purpose of the FNSKNUM routine is to display timed out skipped numbers only one at a time while at the same time sequencing through the timed out displayed skipped numbers when there is more than one. Assuming there is more than one timed out skipped number, the process for accomplishing this is shown in FIG. 6. Block 53 advances the stack pointer from the current displayed skipped number of block 52. Block 54 handles the end-of-stack situation which will be discussed later. Block 53 detects invalid skipped numbers and causes the stack to advance without action. Block 56 seeks timed-out skipped numbers and advances the stack otherwise.

When a timed-out skipped number is detected by block 56 it is saved in the SKINDX register as the next skipped number to display, after which control is returned to the main program to await the next call one second later.

Block 54 having detected the end of the stack causes the stack to reset after which blocks 61 and 62 duplicate the action of blocks 55 and 56 in detecting invalid numbers and selecting timed-out skipped numbers. Block 63 acts in parallel with block 53 to advance the skipped number pointer in response to blocks 61 and 62 as necessary. Block 64 detects the end of the stack (for the second time) and, when found, causes return to the main program by block 58. If the end of the stack is not found by block 64, operation of block 61 and 62 is repeated until a skipped number to display is found or the end of the stack is detected for the second time.

It will be seen that the routine shown in FIG. 6 operates once a second to search at least one time fully through the stack to find any skipped number which is timed-out in addition to the one that is being displayed. This also serves to remove from the display any number removed from skipped number status. FIG. 7 shows the routine for deleting numbers (DSKNUM) which includes a housekeeping function of deleting a number in the skipped number stack that had not otherwise been deleted. The keypad delete input 73 activates block 74 to call the DSKNUM routine at block 75 which initiates block 76 to search the skipped number stack for that number. If no duplicate is found, block 77 routes control directly to the "delete number from paging stack operation" of block 79 whence return block 81 returns control to the main program. If block 77 finds the number to be deleted in the skipped number stack, the additional function of deleting the number from the skipped number stack is performed in block 78 before proceeding to block 79 for deleting the number from the paging stack.

It is believed that the overall operation of the system will be apparent from the previous description, however some further discussion of incidental or optional features of the system may be helpful. The LCD screen of the local display is preferably refreshed about every millisecond. The LCD driver loop first checks to see if there are any valid skipped numbers waiting to be displayed. If there are, it displays a message "SKIP #" and a number that has been skipped. If more than one number has been skipped, they will be displayed sequentially as previously explained. In any case, the regular numbers now being paged are displayed. If there are no skipped numbers, only the currently paged numbers are displayed. The wide area display does not display the skipped numbers, only the currently paged numbers.

In addition to deleting paged numbers from the wide area display which have been completed by delivery to the patient, the delete button may also be used to correct errors. In this case the DSKNUM routine checks to see if the number to be deleted is the same as the last number just entered, if so, then this program deletes all the last entered skipped numbers. This corrects the erroneous skipped number entries generated because of the operator error.

An optional alarm or alert may be provided for skipped numbers which have timed-out and it may be implemented by voice, visually, by beeper, or by a printout.

As previously described, the preferred system has an optional feature whereby an erroneous entry that would generate skipped numbers in excess of ten is diverted without generating skipped numbers. When the erroneous number caused by reverse digits or otherwise is eventually deleted, it will leave behind no false skipped numbers to create problems in the system. This feature, together with the ability to immediately delete an erroneous entry and simultaneously eliminate any skipped numbers generated thereby, renders the system relatively free from operator induced error.

Should the tickets or stickers for a particular number be lost or discarded before being issued to a customer, that number may be deleted from the skipped number hopper by simply pressing "DELETE" and that number. It is not necessary to enter the number as a ready number.

In a preferred embodiment, the time delay between when a skipped number is stored in the skipped number hopper and when it is displayed as a skipped number is programmable by the user from zero to nine minutes. Setting its time delay at five minutes is a good balance between having skipped numbers showing too frequently or waiting too long before resolving any problem situation. It should be recalled that when a customer's number is skipped and then later entered into the keypad, his number is removed from the skipped number hopper and, if this is before the program time delay (for example, five minutes) , it does not even attract the attention of the pharmacist. Of course, if the programmable delay time is exceeded, it is called to the attention of the pharmacist by being displayed as a skipped number and by whatever alert signal is being employed.

It should be understood that modifications may be made in this system by changing the nature of the wide area display or otherwise to change the paging to incorporate voice or attention-getting features. Also, the skipped number monitoring feature which is an important aspect of this system can be supplemented with other conventional queue management or customer service management features without negating the utility and effectiveness of the novel features provided by the present invention.

In addition to the modifications and variations of the system which have been described or suggested, other variations and modifications will be apparent to those of skill in the art and, accordingly, the scope of the invention is not be deemed limited to the preferred embodiment or variations disclosed or suggested, but is, rather, to be determined by reference to the appended claims.

What is claimed is:

1. A method of monitoring and communicating the completion of sequenced tasks comprising the steps of:

a) recording each task accepted with sequence of acceptance;

b) marking a deliverable task as ready and concurrently, for unready tasks earlier in sequence than task turned ready, marking each such unready task as skipped and starting to measure elapsed time from the ready time for each such unready task;

c) after a predetermined skip limit time, marking as timed out each skipped task which is still unready having an elapsed time greater than said skip limit time;

d) when a skipped task becomes ready, removing said task from skipped status and marking it as ready;

e) when a task is completed, by delivery or otherwise, unmarking such task as ready or as skipped.

2. A method as recited in claim 1 further including a step of communicating all ready task identities to a wide area display device to be displayed thereon.

3. A method as recited in claim 1 further including a step of communicating selected skipped and timed out task identities to a local area display device.

4. A method as recited in claim 2 further including a step of causing ready task identities displayed on said wide area display device to be deleted in response to a delete instruction.

5. A method as recited in claim 4 wherein the procedure for timing length of skipped status for a particular task includes storing an elapsed time code linked to such task and periodically incrementing all such codes and checking such codes for any exceeding the time out limit.

6. A method as recited in claim 4 further including a step of communicating selected skipped and timed out task identities to a local area display device.

7. A method as recited in claim 1 wherein the procedure for timing length of skipped status for a particular task includes storing an elapsed time code linked to such task and periodically incrementing all such codes and checking such codes for any exceeding the time out limit.

8. A method as recited in claim 2 wherein the procedure for timing length of skipped status for a particular task includes storing an elapsed time code linked to such task and periodically incrementing all such codes and checking such codes for any exceeding the time out limit.

9. A method of monitoring and communicating the completion of sequenced tasks comprising the steps of:

a) recording each task accepted with sequence of acceptance;

b) marking a deliverable task as ready and concurrently, for unready tasks earlier in sequence than task turned ready, marking each such unready task identity as skipped and starting to measure elapsed time from the ready time for each such unready task;

c) communicating all ready task identities to a wide area display device to be displayed thereon;

d) after a predetermined skip limit time, marking as timed out each skipped task which is still unready having an elapsed time greater than said skip limit time;

e) when a skipped task becomes ready, removing said task identity from skipped status, marking it as ready, and communicating it to said wide area display device;

f) when a task is completed, by delivery or otherwise, unmarking such task as ready or as skipped.

10. A method as recited in claim 9 further including a step of communicating selected skipped and timed out task identities to a local area display device.

11. A method as recited in claim 10 further including a step of causing ready task identities displayed on said wide area display device to be deleted in response to a delete instruction.

12. Apparatus for monitoring and communicating the completion of sequentially identified tasks comprising:

a) means for marking a deliverable task as ready and concurrently, for unready tasks earlier in sequence than such task turned ready, marking each such unready task as skipped and measuring time elapsed from this ready time for each such unready task;

b) means for communicating the identity of ready tasks to a large area;

c) means for marking and displaying as timed out each skipped task which is still unready having an elapsed time greater than said skip limit time; and d) means for removing a skipped task from skipped status and marking it as ready when said skipped task becomes ready.

13. Apparatus as recited in claim 12 wherein said means for communicating the identity of ready tasks to a large area includes a multi-digit visual display device.

14. Apparatus as recited in claim 12 further including a local area display device and means for communicating selected skipped and timed out task identities to said local area display device.

15. Apparatus as recited in claim 13 further including means for causing ready task identities displayed on said visual display device to be deleted in response to a delete instruction.

16. Apparatus as recited in claim 12 wherein said means for measuring time elapsed in skipped status for a particular task includes means for storing an elapsed time code linked to such task identity, means for periodically incrementing all such codes, and means for checking such codes for any exceeding the time out limit.

* * * * *